(12) United States Patent
Okuya et al.

(10) Patent No.: US 7,408,341 B2
(45) Date of Patent: Aug. 5, 2008

(54) ROTATION ANGLE DETECTION DEVICE

(75) Inventors: Hisayoshi Okuya, Nishio (JP); Kota Saito, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/599,297

(22) Filed: Nov. 15, 2006

(65) Prior Publication Data

US 2007/0108967 A1 May 17, 2007

(30) Foreign Application Priority Data

Nov. 15, 2005 (JP) ............................. 2005-330391

(51) Int. Cl.
*G01B 7/30* (2006.01)
(52) U.S. Cl. ............................. 324/207.25; 324/207.2
(58) Field of Classification Search ................. 73/1.79, 73/121, 130, 132; 324/207.2, 207.12, 207.21, 324/207.25, 207.22
See application file for complete search history.

(56) References Cited

U.S. PATENT DOCUMENTS 6,476,600 B2   11/2002   Kono et al.
2003/0052669 A1*   3/2003   Enomoto et al. ....... 324/207.25
2004/0041558 A1*   3/2004   Hasegawa et al. ...... 324/207.25
2006/0176050 A1*   8/2006   LaPlaca ................. 324/207.25
2007/0103149 A1*   5/2007   Horie et al. ............ 324/207.25

FOREIGN PATENT DOCUMENTS

JP   2005-106577   9/2003

* cited by examiner

*Primary Examiner*—Patrick Assouad
*Assistant Examiner*—David M. Schindler
(74) *Attorney, Agent, or Firm*—Reed Smith LLP; Stanley P. Fisher, Esq.; Juan Carlos A. Marquez, Esq.

(57) ABSTRACT

A rotation angle detection device includes a housing including a magnetic sensor, a rotation member rotatable relative to the housing and including a magnet facing the magnetic sensor, and a shaft member operated so as to rotate with an operated member. A rotation angle of the operated member is detected on the basis of a change of an output signal from the magnetic sensor rotatable relative to the magnet. The rotation member and the shaft member are connected to each other in such a manner that axes thereof are tiltable towards each other. Further, the rotation angle detection device includes a centering mechanism for retaining the rotation member and the housing member in a coaxial manner regardless of a tilting of the shaft member.

11 Claims, 6 Drawing Sheets

ROTATION ANGLE DETECTION DEVICE

CROSS REFERENCE TO RELATED APPLICATIONS

This application is based on and claims priority under 35 U.S.C. § 119 to Japanese Patent Application No. 2005-330391, filed on Nov. 15, 2005, the entire content of which is incorporated herein by reference.

FIELD OF THE INVENTION

This invention generally relates to a rotation angle detection device.

BACKGROUND

A known rotation angle detection device is disclosed in JP2001-317909A. The rotation angle detection device disclosed includes a housing equipped with a Hall IC (magnetic sensor), a rotation shaft (shaft member) operated so as to rotate as a unit with an operated member, and a rotor core (rotation member) having a magnet. When the rotor core rotates along with a rotation of the operated member such as a throttle valve, in response to a rotation angle of the rotor core, a magnetic flux density passing through the Hall IC varies. Then, in response to this magnetic flux density, an output of the Hall IC varies. A control circuit reads this output of the Hall IC and then detects a rotation angle of the rotor core and the operated member.

However, according to the aforementioned rotation angle detection device, the rotor core and the rotation shaft are integrally fixed to each other by means of riveting, and the like. That is, the rotor core and the rotation shaft are not rotatable relative to each other and are connected in such a manner that axes of the rotor core and the rotation shaft are not tiltable to each other. When a stress involving a tilting component, i.e. a stress that causes the axis of the rotation shaft to tilt relative to a fixed axis of the housing, is added to the rotation shaft via the operated member, a position of the magnet provided at the rotor core relative to the Hall IC provided at the housing is changed, thereby decreasing rotation angle detecting accuracy.

Thus, a need exists for a rotation angle detection device of which rotation angle detecting accuracy is prevented from decreasing even if a stress involving a tilt component is applied to a shaft member via an operated member.

SUMMARY OF THE INVENTION

According to an aspect of the present invention, a rotation angle detection device includes a housing including a magnetic sensor, a rotation member rotatable relative to the housing and including a magnet facing the magnetic sensor, and a shaft member operated so as to rotate with an operated member. A rotation angle of the operated member is detected on the basis of a change of an output signal from the magnetic sensor rotatable relative to the magnet. The rotation member and the shaft member are connected to each other in such a manner that axes thereof are tiltable towards each other. Further, the rotation angle detection device includes a centering mechanism for retaining the rotation member and the housing member in a coaxial manner regardless of a tilting of the shaft member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1A:
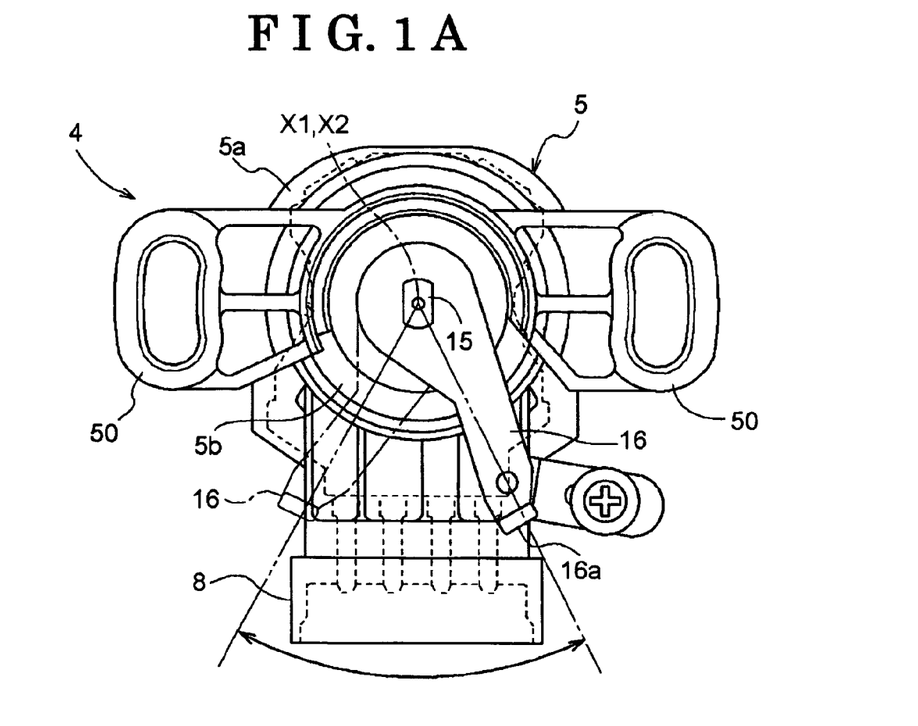
FIG. 1A is a schematic side view of a control pedal unit equipped with a rotation angle detection device according to an embodiment of the present invention.
Figure 1B:
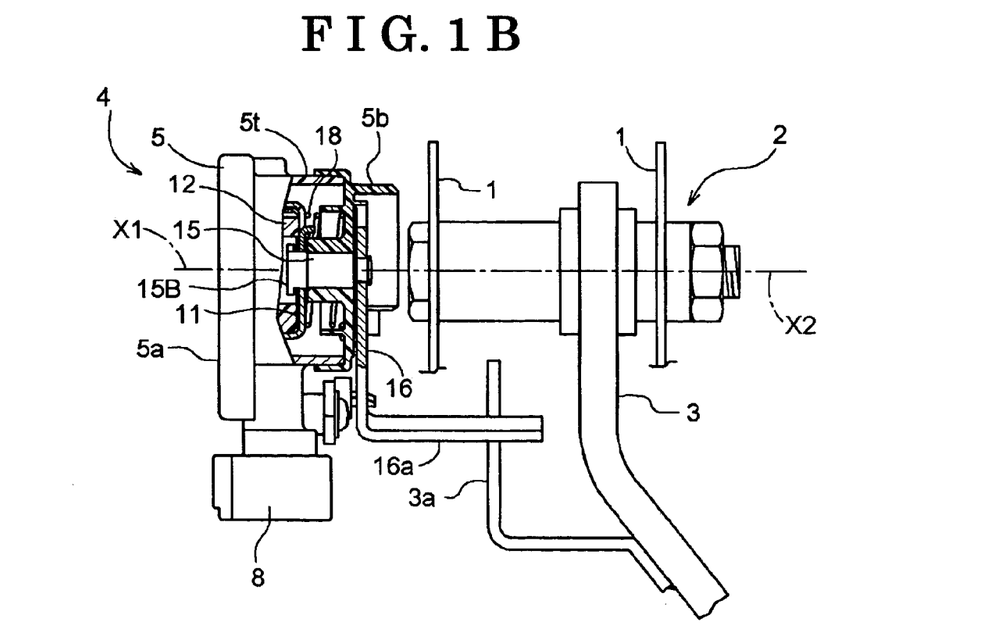
FIG. 1B is a schematic front view of the control pedal unit equipped with the rotation angle detection device according to the embodiment of the present invention.

An embodiment of the present invention will be explained with reference to the attached drawings. FIGS. 1A and 1B are schematic views of a control pedal unit 2 such as a brake pedal provided in a vehicle. Precisely, FIG. 1A is a side view of a rotation angle detection device 4 incorporated in the control pedal unit 2. FIG. 1B is a front view of the control pedal unit 2. As shown in FIG. 1B, the control pedal unit 2 includes a pedal arm 3 supported, being rotatable relative to a bracket 1 about an axis X1 thereof, the bracket 1 being mounted on a vehicle body so as to project therefrom, and the rotation angle detection device 4 that detects a rotation angle of the pedal arm 3 operated by a driver.

Figure 2:
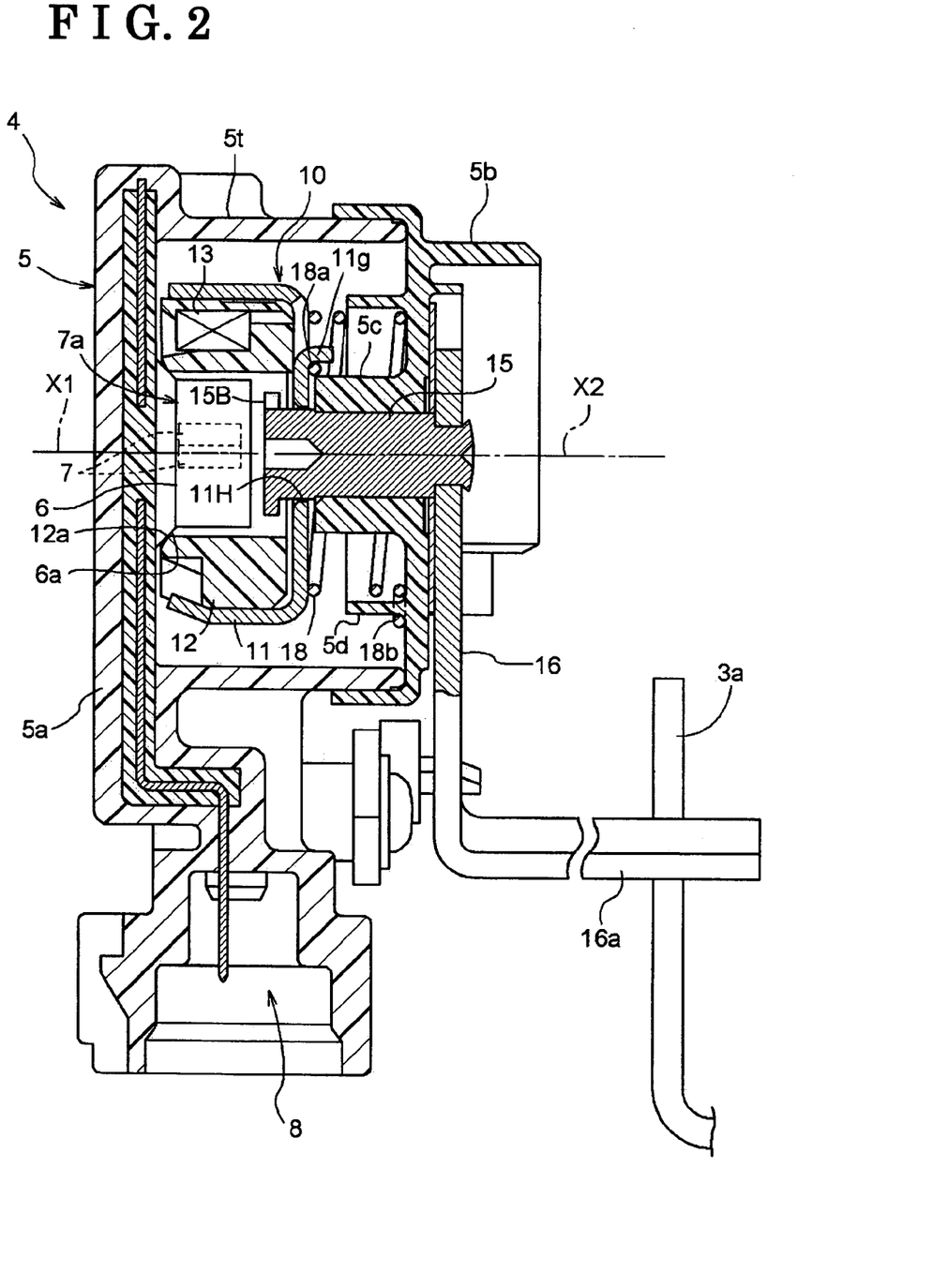
FIG. 2 is a cross-sectional front view of the rotation angle detection device according to the embodiment of the present invention.

As shown in FIG. 2, the rotation angle detection device 4 includes a housing 5 made of plastic and including a magnetic unit 7a, a rotation member 10 accommodated within the housing 5, and a shaft member 15 pivotally supported by a portion of the housing 5. The shaft member 15 is fixed by means of riveting, and the like, to a base portion of a sensor lever 16 (example of an operated member) so that the shaft member 15 is prevented from rotating and inclining relative to the sensor lever 16. In addition, a bended end portion 16a of the sensor lever 16 is constantly pressed against a pedal lever 3a integrally extending from the pedal arm 3. The rotation member 10 includes two pairs of permanent magnets 13 while the magnetic unit 7a of the housing 5 includes one pair of Hall ICs 7 (example of a magnetic sensor) arranged so as to face the permanent magnets 13, and a capacitor for noise removal (not shown). In addition, the housing 5 includes a connector portion 8 for acquiring an output signal from the Hall ICs 7.

The sensor lever 16 is fixed to the shaft member 15 in a cantilevered manner. Further, the pedal lever 3a operates to rotate the sensor lever 16 in a position displaced from the shaft member 15 along a direction of the axis X1. Thus, a stress added from the pedal lever 3a to the sensor lever 16 is likely to cause the shaft member 15 to incline or tilt relative to the housing 5. When the pedal arm 3 is operated to rotate by means of a depression of a pedal by a driver, the pedal lever 3a and the shaft member 15 rotate as a unit in response to the rotation amount of the pedal arm 3 within a range shown by a curved arrow in FIG. 1A, thereby rotating the rotation member 10. The Hall ICs 7 of the housing 5 are arranged in a position where a magnetic flux is applied from the permanent magnets 13 provided at the rotation member 10. Therefore, a rotation angle of the sensor lever 16 can be acquired from the connector portion 8 as a change in an output signal from the Hall ICs 7 that relatively rotate to the permanent magnets 13.

Figure 3:
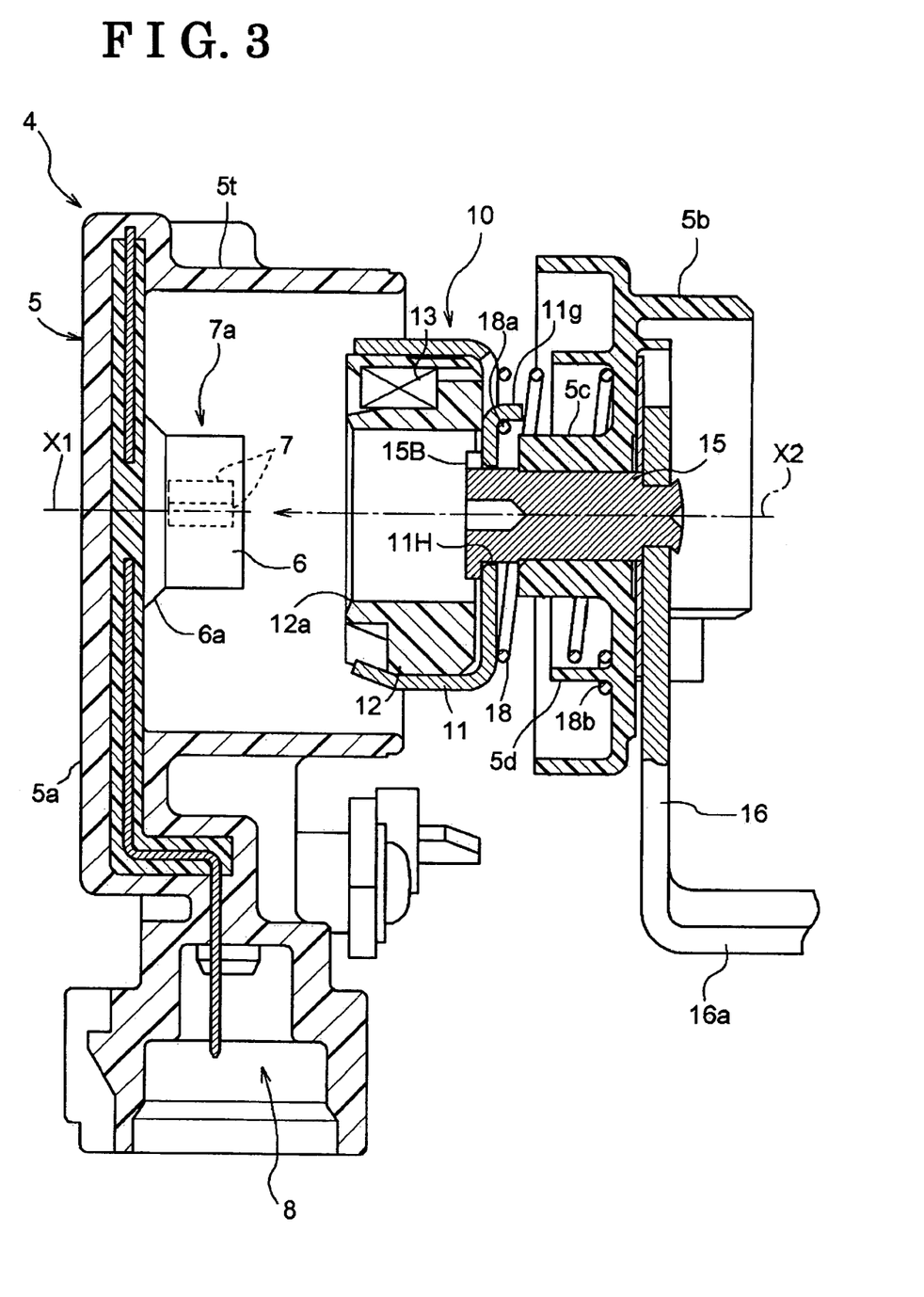
FIG. 3 is a cross-sectional front view of the rotation angle detection device before assembly.

More precisely, as shown in FIGS. 2 and 3, the housing 5 includes a housing main body 5a having the magnetic unit 7a, the connector portion 8, and a substantially cylindrical receiving portion 5t, and a cover member 5b for tightly closing or covering the receiving portion 5t. The housing main body 5a and the cover member 5b are made of plastic and fixed to each other by laser welding, and the like. A substantially column-shaped boss portion 6 is formed in the vicinity of a center of the housing main body 5a so as to project towards the shaft member 15. The pair of Hall ICs 7 are accommodated within the boss portion 6 by insert-molding. The shaft member 15 is pivotally supported by a cylindrical-shaped bearing 5c formed in the vicinity of a center of the cover member 5b. The housing 5 is fixed by screwing to a vehicle body through a pair of fitting brackets 50 formed, integrally extending from the housing main body 5a in a direction where the pair of fitting brackets 50 oppose to or separate from each other, as shown in FIG. 1A. The rotation member 10 includes a cup-shaped yoke main body 11 and a magnet holder 12 fixed to an inner peripheral face of the yoke main body 11. The yoke main body 11 is made of a magnetic material such as iron and nickel alloy while the magnet holder 12 is made of a non-magnetic material such as plastic. The permanent magnets 13 are supported and received within the magnet holder 12. The yoke main body 11 equipped with the permanent magnets 13 constitutes a kind of a magnetic circuit.

Figure 4:
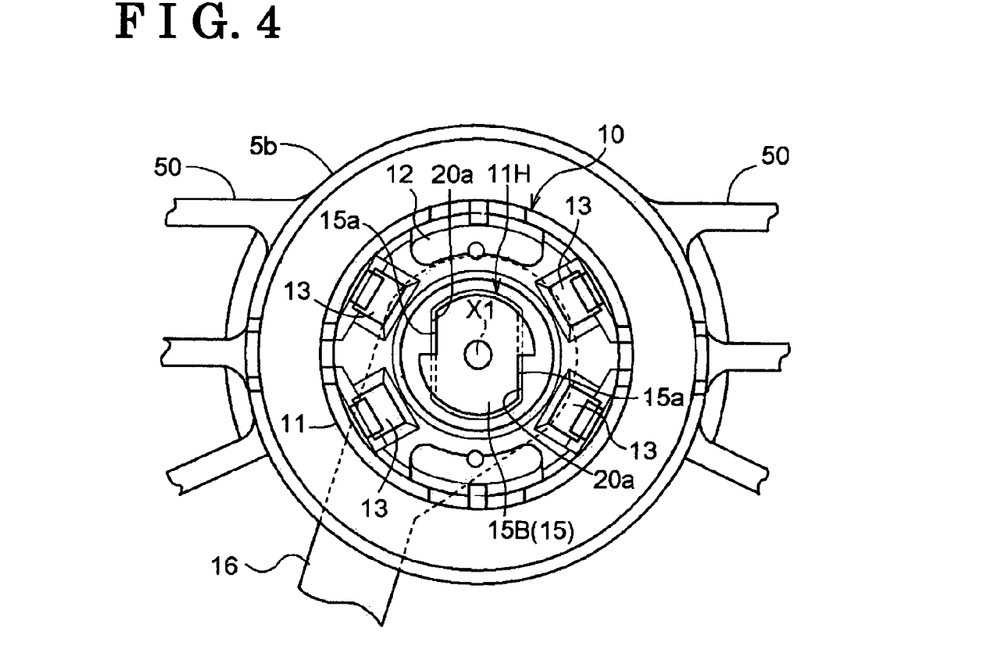
FIG. 4 is a cross-sectional side view of a main portion of the rotation angle detection device.
Figure 5:
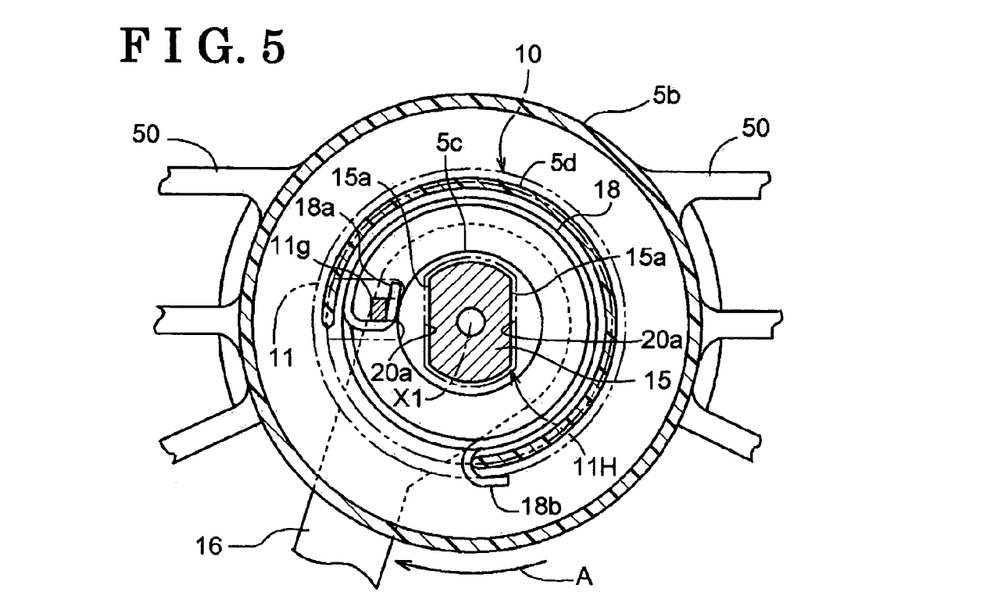
FIG. 5 is a cross-sectional side view of a main portion of the rotation angle detection device.

According to one of the features of the rotation angle detection device 4 of the present embodiment, the rotation member 10 and the shaft member 15 are connected to each other in such a manner that axes thereof are tiltable to each other. That is, as shown in FIGS. 4 and 5, the shaft member 15 includes a cross-section of which a circumference is not in a rotational symmetrical shape, which is effective for transmission of a rotational driving force. Meanwhile, the yoke main body 11 includes a through-hole 11H in the vicinity of a bottom face, corresponding to the cross-section of the shaft member 15. A size of the through-hole 11H is formed to be slightly larger than that of the section of the shaft member 15. Thus, the rotation member 10 can be tilted in any direction relative to the shaft member 15. Even if the shaft member 15 is tilted relative to the housing 5 in the cases where the sensor lever 16 is operated to rotate by means of the pedal lever 3a, the rotation member 10 provided within the housing 5 is not forced to tilt. At this time, the rotation member 10 into which the shaft member 15 is disposed is prevented from disengaging from the shaft member 15 by means of a bolt 15B having a head portion projecting further in a radial direction than the section of the shaft member 15.

Figure 6:
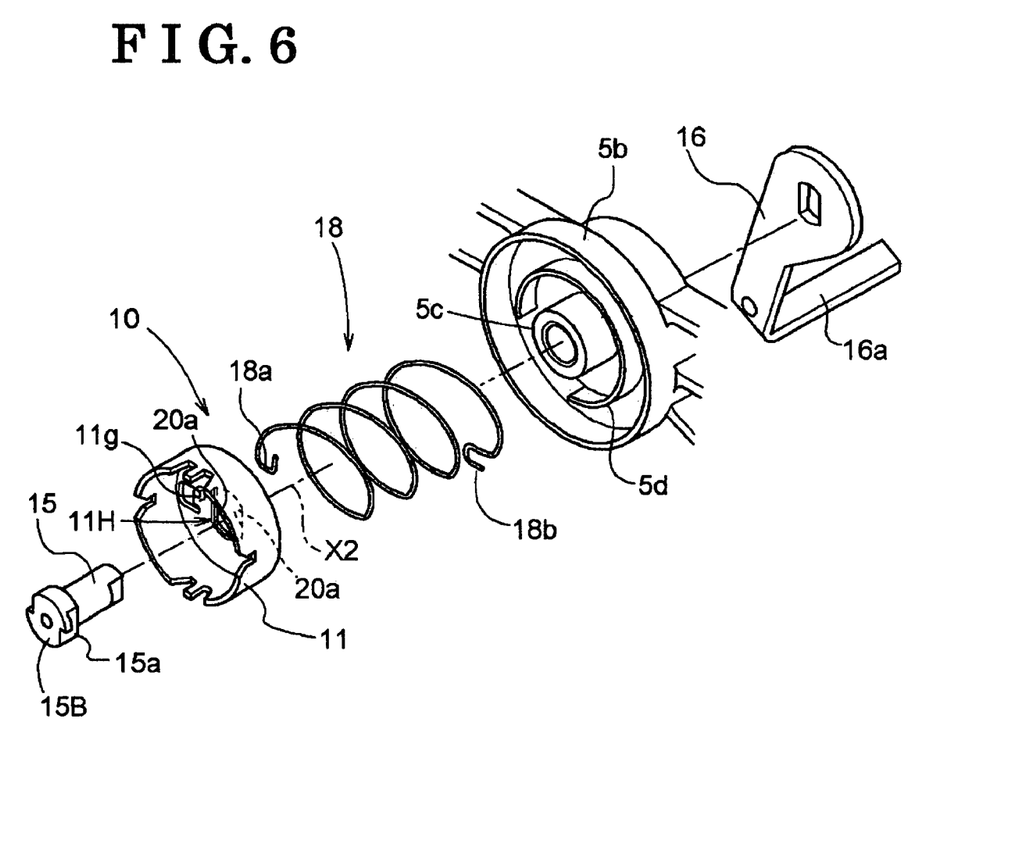
FIG. 6 is an exploded perspective view of the rotation angle detection device.

A rotation transmitting mechanism is provided between the rotation member 10 and the shaft member 15 so as to transmit a rotation of the shaft member 15 to the rotation member 10. Precisely, as shown in FIGS. 4 and 5, the through-hole 11H of the rotation member 10 includes a pair of rotation restricting faces 20a (example of a rotation restricting portion) that face each other relative to the axis X1 and that extend in a radial direction relative to the axis X1. Meanwhile, a pair of restricted faces 15a (example of a restricted portion) are formed in the vicinity of an end portion on a side face of the shaft member 15. The restricted faces 15a come in contact with the rotation restricting faces 20a, respectively, according to a rotation of the rotation member 10 relative to the shaft member 15 in an arrow A direction in FIG. 5. Further, as shown in FIGS. 5 and 6, the rotation transmitting mechanism includes a coil spring 18 for biasing the rotation member 10 to rotate relative to the shaft member 15 in a direction in which the rotation restricting faces 20a and the restricted faces 15a are pressed against each other. Because of the operation of the coil spring 18, even if the rotation member 10 and the shaft member 15 are provided in a tiltable manner, the rotation of the shaft member 15 is transmitted without any delay to the rotation member 10 regardless of a rotation phase of the shaft member 15.

According to the other feature of the rotation angle detection device of the present embodiment, a centering mechanism is provided for retaining a rotation axis X2 of the rotation member 10 to match the fixed axis X1 of the housing 5 regardless of the tilting of the shaft member 15 relative to the housing 5, which may be caused when the sensor lever 16 is operated to rotate by means of the pedal lever 3a. As shown in FIGS. 2 and 3, the centering mechanism includes an inclined face 6a annularly formed along a base portion of the boss portion 6 of the housing 5. The coil spring 18 constantly biases or presses an annular edge portion 12a formed at axially one end of the magnet holder 12 to a substantially middle portion of the inclined face 6a. The inclined face 6a extends in a circumferential direction with reference to the fixed axis X1 in a rotational symmetry state. In view of a cross-section passing through the fixed axis X1 of the housing 5, the inclined face 6a is inclined by approximately 45 degrees relative to the fixed axis X1.

Figure 7A:
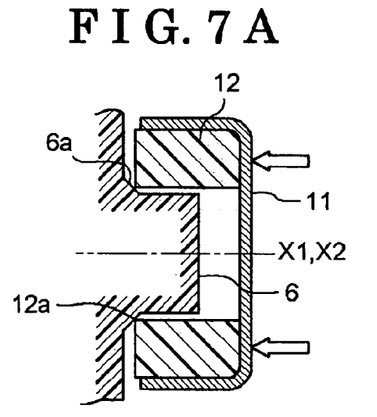
FIGS. 7A, 7B, 7C, 7D, 7E, and 7F are schematic views of various centering mechanisms.

The edge portion 12a of the magnet holder 12 forms an exterior angle of approximately 100 degrees relative to the fixed axis X1 of the housing 5 in the cross-section passing through the fixed axis X1. The edge portion 12a is smoothly slidable on the inclined face 6a of the housing 5. A diameter of the inner peripheral face of the magnet holder 12 is sufficiently larger than the outer diameter of the boss portion 6 of the housing 5 so that the magnet holder 12 is relatively rotatable to the boss portion 6 in a state where the inner peripheral face of the magnet holder 12 is not in contact with the boss portion 6. Accordingly, as shown in FIG. 7A, when the edge portion 12a of the rotation member 10 is biased and pressed to the inclined face 6a by the coil spring 18, the edge portion 12a tends to be positioned concentrically on the inclined face 6a with reference to the fixed axis X1. This circumstance is equal to a principle in which a ring, for example, placed on a generatrix of a circular cone standing straight is most stable in a state where, due to its own weight, a center axis of the circular cone and an axis of the ring match each other. As a result, the rotation member 10 is automatically controlled to a state where the axis X2 thereof matches the fixed axis X1 of the housing 5.

As mentioned above, the coil spring 18 biases the rotation member 10 to rotate in the arrow A direction (see FIG. 5) relative to the shaft member 15, and also biases a portion of the rotation member 10 to be pressed against the inclined face 6a of the housing 5. As shown in FIG. 2, at least a half length of the coil spring 18 is received within a cylindrical-shaped protection wall 5d formed so as to project in parallel to the bearing 5c from an inner face of the cover member 5b. Then, as shown in FIGS. 2 and 5, one end 18a of the coil spring 18 engages with a hook portion 11g formed by bending a portion of a bottom portion of the yoke main body 11 in a downward direction, i.e. rightward direction in FIG. 3, while the other end 18b of the coil spring 18 engages with a portion on a base side of the protection wall 5d of the cover member 5b of the housing 5, instead of the shaft member 15. As a result, the coil spring 18 biases the sensor lever 16 to its home position via the rotation member 10 and the shaft member 15, and also functions as a return spring for retaining the sensor lever 16 to engage with the pedal lever 3a regardless of a rotating state of the pedal lever 3a.

The housing 5 can be made of PBT (polybutylene terephthalate), for example, and the magnet holder 12 biased and pressed against the inclined face 6a can be made of PA6 (Nylon 6), for example, that includes molybdenum disulfide so that the magnet holder 12 can have a sliding durability.

Figure 7B:
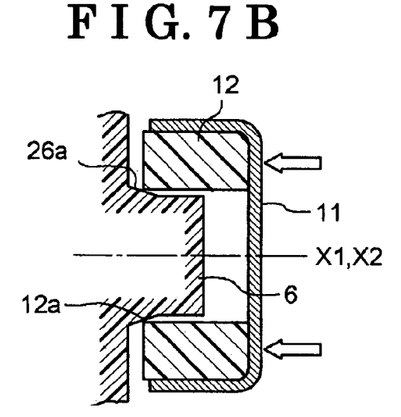

Depending on a coefficient of friction between the inclined face 6a of the boss portion 6 of the housing 5 and the edge portion 12a of the magnet holder 12, an annular-shaped inclined face 26a shown in FIG. 7B that has an inclination less than 45 degrees relative to the fixed axis X1 in the cross-section passing through the fixed axis X1 may better achieve a sufficient centering function even if the biasing force along the fixed axis X1 by the coil spring 18 is specified smaller. If the biasing force by the coil spring 18 is able to be defined smaller, the inclined face 6a or the edge portion 12a of the magnet holder 12 may be prevented from abrading away due to friction thereof. However, excessively small inclination of the inclined face may cause difficulty in sliding of the edge portion 12a of the magnet holder 12 on the inclined face 6a. Thus, the inclination of the inclined face can be specified in a range between 15 degrees and 40 degrees.

Figure 7C:
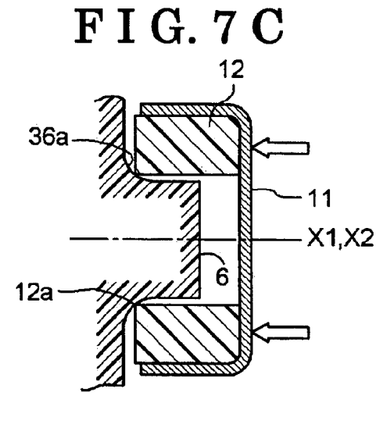

As shown in FIG. 7C, an inclined face 36a having an arc shape of which a center is positioned within the annular edge portion 12a of the rotation member 10 can be provided instead of the inclined face having a linear shape in view of the cross-section passing through the fixed axis X of the housing 5. However, in this case, a tangent passing on a contact point between the annular edge portion 12a and the inclined face 36a may form an angle between 15 degrees and 40 degrees relative to the fixed axis X1 in a state in which the rotation member 10 and the housing 5 are concentric.

Figure 7D:
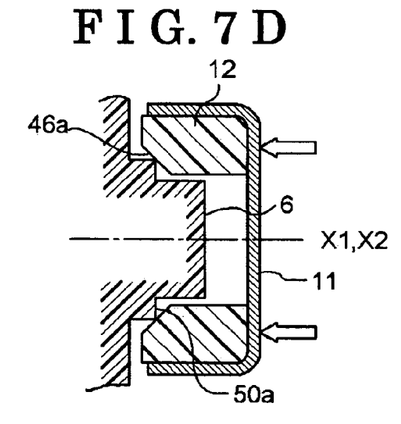

Alternatively, according to the centering mechanism as shown in FIG. 7D, an inclined face 46a may be formed at axially one end of the rotation member 10 so as to extend annularly. In addition, a projecting portion (edge portion) 50a may be formed on an outer periphery of the base portion of the boss portion 6 of the housing 5 so as to annularly extend with reference to the fixed axis X1.

Figure 7E:
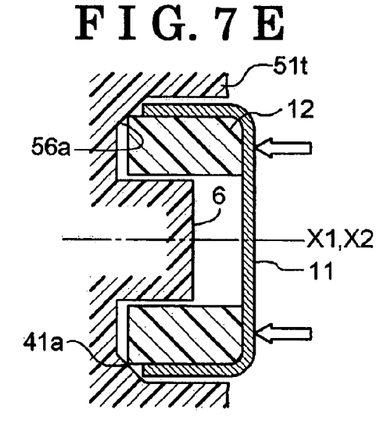

Further alternatively, according to the centering mechanism as shown in FIG. 7E, an inclined face 56a is formed on an inner peripheral face of a cylindrical-shaped receiving portion 51t that is formed to extend from an outer edge of the housing 5. Then, an annular edge portion 41a formed in the vicinity of a tip end of an outer peripheral face of the magnet holder 12 may be slidable to the inclined face 56a.

Figure 7F:
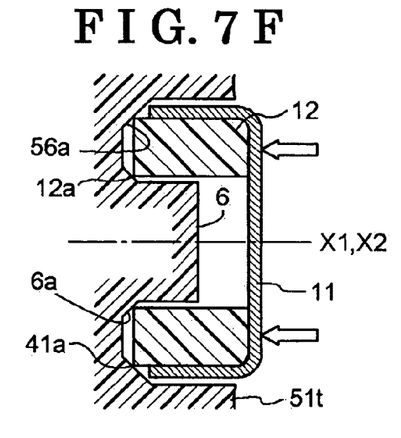

Still further alternatively, according to the centering mechanism as shown in FIG. 7F, the inclined face 6a is formed along the outer periphery of the base portion of the boss portion 6 of the housing 5, and the inclined face 56a is formed on an inner peripheral face of the cylindrical receiving portion 51t that is formed to extend from an outer edge of the housing 5. Then, the annular edge portion 12a formed at axially one end of the magnet holder 12 and the annular edge portion 41a formed in the vicinity of the tip end of the outer peripheral face of the magnet holder 12 are slidable to the inclined faces 6a and 56a, respectively.

The aforementioned inclined faces 6a, 26a, 36a, and 46a, and the edge portions 12a, 41a, and 50a each may not have a continuous annular shape forming a perfect circumference, and each may have multiple inclined faces or multiple edge portions as interrupted at several portions on each circumference, as long as the edge portion of the magnet holder 12 is smoothly slidable on the inclined face within an area where the rotation member 10 is rotated on the basis of the rotation of the pedal arm 3. When at least one of the inclined face and the edge portion of the magnet holder is divided into multiple contact faces, friction between the inclined face and the edge portion of the magnet holder, and abrasion due to that friction may be decreased.

Further, the other form of a spring instead of the coil spring may be used as a biasing means for biasing the rotation member 10 to rotate in the arrow A direction relative to the shaft member 15, and for biasing a portion of the rotation member 10 to be pressed against the inclined face 6a of the housing 5 as a part of the centering mechanism. For example, the biasing means can be constituted by a spring having a ring-shaped base portion fixed to the housing, and multiple plate-shaped or pin-shaped pieces obliquely extending from multiple portions at the base portion to a bottom portion of the rotation member 10.

Furthermore, a first biasing means for biasing the rotation member 10 to rotate in the arrow A direction relative to the shaft member 15, and, as a part of the centering mechanism, a second biasing means for biasing a portion of the rotation member 10 to be pressed against the housing 5 may be constituted by respective springs. In this case, for example, the second biasing means can be constituted by a plate spring, and the like, instead of a coil spring.

The present embodiment can be employed in a rotation angle detection device for detecting a rotation angle of an operated member that is operated to rotate by means of a control pedal of a vehicle.

According to the aforementioned embodiment, even if the shaft member 15 is tilted relative to the housing 5 because of the rotation operation of the sensor lever 16, the rotation axis X2 of the rotation member 10 is constantly retained in a predetermined position relative to the fixed axis X1 of the housing 5 by means of the centering mechanism. Thus, a certain level of rotation angle detection accuracy can be obtained.

Further, according to the aforementioned embodiment, the rotation member 10 is connected to the shaft member in a tiltable manner. Thus, even if a looseness is present in a rotation direction between the rotation member 10 and the shaft member 15, the rotation restricting face 20a and the restricted face 15a are retained so as to be contact with each other by means of a biasing force of the coil spring 18 in the rotational direction. Accordingly, a relative angle between the rotation member 10 and the shaft member 15 is retained at a constant level thereby surely detecting the rotation angle of the sensor lever 16. In addition, a biasing means for biasing the rotation member 10 to be pressed against the annular-shaped inclined face and a biasing means provided for eliminating a looseness of the rotation member 10 relative to the shaft member 15 can be combined into a single biasing means of a coil spring shape.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotation angle detection device, comprising:
   a housing including a magnetic sensor;
   a rotation member rotatable relative to the housing and including a magnet facing the magnetic sensor;
   a shaft member operated so as to rotate with an operated member, a rotation angle of the operated member being detected on the basis of a change of an output signal from the magnetic sensor rotatable relative to the magnet;
   the rotation member and the shaft member being connected to each other in such a manner that axes thereof are tiltable towards each other; and
   a centering mechanism for retaining the rotation member and the housing in a coaxial manner regardless of a tilting of the shaft member.

2. A rotation angle detection device according to claim 1, wherein the axis of the rotation member and a fixed axis of the housing are coaxially maintained.

3. A rotation angle detection device according to claim 2, wherein the centering mechanism includes an inclined face formed in the housing and extending in a circumferential direction centered at the fixed axis, and the centering mechanism includes a biasing means for biasing an edge portion formed at axially one end of the rotation member to be pressed against the inclined face of the housing.

4. A rotation angle detection device according to claim 3, wherein the rotation member includes a rotation restricting portion while the shaft member includes a restricted portion that comes in contact with the rotation restricting portion based on a rotation of the rotation member in a predetermined direction relative to the shaft member, and the biasing means is a coil spring that biases the rotation member to be pressed against the inclined face of the housing and at the same time that biases the rotation member to rotate in the predetermined direction relative to the shaft member.

5. A rotation angle detection device according to claim 2, wherein the housing is of a cylindrical shape and includes a cylindrical-shaped boss portion projecting from a center of the housing.

6. A rotation angle detection device according to claim 5, wherein the boss portion accommodates therein a Hall element by insert molding.

7. A rotation angle detection device according to claim 2, wherein the rotation member includes a cup-shaped yoke main body and a magnet holder made of a nonmagnetic material and provided on an inner peripheral face of the yoke main body, the magnet holder accommodating the magnet therein.

8. A rotation angle detection device according to claim 5, wherein the centering mechanism includes an inclined face in the housing and having an inclination of approximately 45 degrees relative to the fixed axis of the boss portion of the housing.

9. A rotation angle detection device according to claim 7, wherein the magnet holder includes an annular edge portion.

10. A rotation angle detection device according to claim 9, wherein the edge portion of the magnet holder forms an external angle of approximately 100 degrees relative to the fixed axis of the housing in a cross-section passing through the fixed axis of the housing.

11. A rotation angle detection device according to claim 10, wherein a diameter of an inner peripheral face of the edge portion of the magnet holder is specified to be larger than an outer diameter of the boss portion.

* * * * *